G. A. STEPHENSON & O. L. SUTLIFF.

Improvement in Lightning Rods.

No. 118,166.                                                        Patented August 15, 1871.

UNITED STATES PATENT OFFICE.

GEORGE A. STEPHENSON AND OLIVER L. SUTLIFF, OF WOOSTER, OHIO.

IMPROVEMENT IN LIGHTNING-RODS.

Specification forming part of Letters Patent No. 118,166, dated August 15, 1871.

*To all whom it may concern:*

Be it known that we, GEORGE A. STEPHENSON and OLIVER L. SUTLIFF, of Wooster, in the county of Wayne and in the State of Ohio, have invented certain new and useful Improvements in Lightning-Rods; and do hereby declare that the following is a full, clear, and exact description thereof, reference being had to the accompanying drawing and to the letters of reference marked thereon making a part of this specification.

The nature of our invention consists in the construction and arrangement of a joint for connecting the sections of a lightning-rod, as will be hereinafter more fully set forth.

In order to enable others skilled in the art to which our invention appertains to make and use the same, we will now proceed to describe its construction and operation, referring to the annexed drawing, in which—

Figure 1:
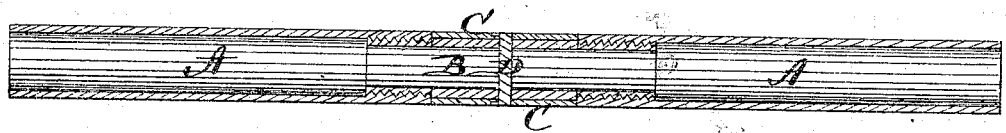
Figure 2:

Figure 1 is a longitudinal vertical section of two sections of a lightning-rod coupled together with our joint, and Fig. 2 is an end view of the same.

A A represent two sections of a lightning-rod provided in their ends with female-screw threads. These sections are joined together by means of a right-and-left-hand screw, B, over which a self-adjusting ferrule, C, is placed to fill up the thickness of the rod at the joint, so as to keep an even surface, as well as to adjust itself to the advance of the screw should one section start on the end of the dowel sooner than the other. The pin D, which passes through the screw B and slots in the ferrule C, may be made either of copper, iron, or steel, and keeps the ferrule from turning while screwing up the joint perfectly tight.

This joint may be used both on tubular and solid lightning-rods.

Its advantages are in the main as follows: We can bend and shape our rod and fit it to the building, about the cornice and all parts of the building, and then turn the screw into the rods or sections and draw them together, thus avoiding any strain on the joint by bending after the connection is made. We can take out a section at any time, or place in the rod after it is on the building, without disturbing the bends in the rod or general position of the rod while siding the building or reroofing it. We can take out sections of the rod and replace them at will without harm to the rod. We avoid the turning of long sections of rod, which are liable to be out of line, and therefore, in screwing the sections together, will run across the thread and spoil it entirely, so that when the joint comes together it is worthless; and, furthermore, the joint comes sometimes so close to bends in the rod, and having to bend it after the connection is made the bending expands the joint and renders it worthless. We may make the slots for the pin D in the screw B instead of in the ferrule, and let the ends of the pin be secured in the ferrule. This will answer precisely the same purpose and work in precisely the same manner, and hence we do not wish to confine ourselves particularly to either mode.

Having thus fully described our invention, what we claim as new, and desire to secure by Letters Patent, is—

The within-described joint for lightning-rods, consisting of the right-and-left-hand screw B, ferrule C, and pin D, constructed and arranged substantially as and for the purposes herein set forth.

In testimony that we claim the foregoing we have hereunto set our hands this 21st day of June, 1871.

G. A. STEPHENSON.
    O. L. SUTLIFF.

Witnesses:
  S. R. BOWMITZ,
  J. R. BOWMAN.